United States Patent
Elghazali

(10) Patent No.: US 12,270,385 B2
(45) Date of Patent: Apr. 8, 2025

(54) WING ENERGY REUTILIZATION SYSTEM

(71) Applicant: Abu Dhabi University, Abu Dhabi (AE)

(72) Inventor: Ahmed Fawzi AbdulMoati Abdellatif Elghazali, Abu Dhabi (AE)

(73) Assignee: Abu Dhabi University, Abu Dhabi (AE)

( * ) Notice: Subject to any disclaimer, the term of this patent is extended or adjusted under 35 U.S.C. 154(b) by 0 days.

(21) Appl. No.: 18/110,965

(22) Filed: Feb. 17, 2023

(65) Prior Publication Data

US 2024/0280083 A1     Aug. 22, 2024

(51) Int. Cl.
| | |
|---|---|
| F03D 9/32 | (2016.01) |
| B64C 21/02 | (2006.01) |
| B64D 41/00 | (2006.01) |
| F04B 39/00 | (2006.01) |
| F03D 3/00 | (2006.01) |

(52) U.S. Cl.
CPC ............. *F03D 9/32* (2016.05); *B64C 21/025* (2013.01); *B64D 41/007* (2013.01); *F04B 39/00* (2013.01); *F03D 3/002* (2013.01); *F05B 2240/923* (2013.01)

(58) Field of Classification Search
CPC .... B64D 41/00; B64D 41/007; B64C 31/141; B64C 2000/143; B64C 2000/148; B64C 21/00; B64C 21/02; B64C 21/04; B64C 21/025; B64C 21/06; B64C 2230/04; B64C 23/065; F02C 3/055; F02K 5/023; F04B 9/042; F04B 19/22; F04B 37/12; F03D 1/06495; F03D 1/0685
See application file for complete search history.

(56) References Cited

U.S. PATENT DOCUMENTS

| | | | | |
|---|---|---|---|---|
| 4,917,332 A | * | 4/1990 | Patterson, Jr. | ........ B64C 23/065 290/55 |
| 5,150,859 A | * | 9/1992 | Ransick | ................ B64C 23/065 290/55 |
| 5,934,612 A | * | 8/1999 | Gerhardt | ................ B64C 23/065 244/58 |
| 7,270,214 B1 | * | 9/2007 | Tonnessen | ........... G01V 1/3826 114/274 |
| 2024/0109647 A1 | * | 4/2024 | Morisaki | ................. B64C 21/01 |

FOREIGN PATENT DOCUMENTS

| | | | | |
|---|---|---|---|---|
| EP | 3251948 A1 | * | 12/2017 | ............. B62D 35/00 |
| JP | 2582075 B2 | * | 2/1997 | |

* cited by examiner

Primary Examiner — Philip J Bonzell
Assistant Examiner — Anna L. Gordon

(57) ABSTRACT

An apparatus, including a vertex rotor. The apparatus includes a transmission system, with the transmission system connected to the vertex rotor. The apparatus includes a drive shaft, with the drive shaft connected to the transmission system. The apparatus includes a first bevel gear and a second bevel gear. The first bevel gear and the second bevel gear are connected to the drive shaft.

2 Claims, 20 Drawing Sheets

WING ENERGY REUTILIZATION SYSTEM

BACKGROUND

Aircrafts have various systems that are used to reduce energy usage. This includes continuous climb and descent operations, heat transfer systems, blended wing body design, vortex generators, stall strips, and various systems to reduce drag (e.g., blended wingtip, raked wing tip, wingtip fence, etc.).

Accordingly, there are numerous areas of energy losses that can occur with various aircraft operations. However, there is nothing that effectively recaptures wasted energy from induced drag.

BRIEF DESCRIPTION OF DRA WINGS

DETAILED DESCRIPTION OF PREFERRED EMBODIMENTS

Figure 1:
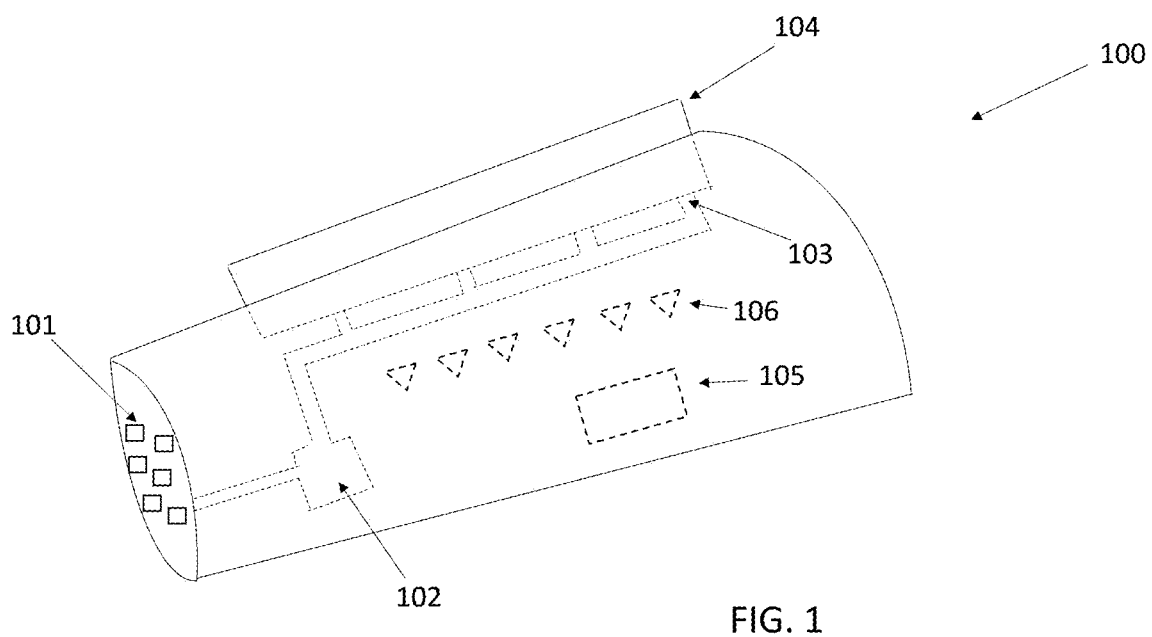
FIG. 1 is a diagram of an example environment in which systems and/or methods described herein may be implemented.

The following detailed description refers to the accompanying drawings. The same reference numbers in different drawings may identify the same or similar elements.

Systems, devices, and/or methods described herein may allow the reutilization of energy (e.g., wind energy) at various locations on an aircraft wing (part of an airplane). By reutilizing air wind energy, the aircraft obtains various benefits including (1) reduction in pressure drag, (2) increase in thrust, (3) reduction in fuel consumption, (4) control over the stall, and (5) control of flow field over the aircraft wing. In embodiments, the systems, devices, and/or methods described herein may use one or more of the following variables to efficiently reutilize the wind air energy: (a) compression ratio, (b) nozzles distribution pattern, (c) wing tip rotor design, and (d) drive system design.

In embodiments, the reutilized energy may be used for various other processes and/or systems on the plane. This may include storing the wind air energy in a type of reservoir (e.g., such as a battery) for later use, using the energy for performance upgrades, extending flight range, and/or running different auxiliary systems of the aircraft. In embodiments, the captured (i.e., reutilized) energy is used in a manner that the system can be self-sustaining. In embodiments, systems, methods, and/or methods described may include a vortex rotor, transmission, drive shaft, stagnation compressor, reservoir, and jet ejector, Accordingly, the energy reutilization system includes two systems. The first system (an energy recapturing system) includes a vortex rotor, transmission, and drive shaft. In embodiments, the vortex rotor utilizes energy captured from an air vortex occurring around an aircraft wing tip. In embodiments, the air vortex may be created by the movement of an airplane. In embodiments, the movement of the airplane includes lift with low-pressure air created above the wing and higher pressure of air below the wing. As a result of the lift and forward movement of the airplane, an air vortex may be created around the aircraft wing tip. In embodiments, the vortex rotor captures that vortex energy by the use of parallel straight blades. In embodiments, the transmission converts wind energy captured by the vortex rotor into a particular amount of torque to a drive shaft and the drive shaft's subcomponents. In embodiments, the drive shaft transmits the torque generated by a set of gears that allows for the movement of compressor arms. The second system (airflow generating system) includes a stagnation compressor, reservoir, and jet ejector. In embodiments, air approaching a wing's leading edge passes through the stagnation compressor. In embodiments, the stagnation compressor increases the air pressure but does not disturb the flow field. In embodiments, the pressurized air is then sent, via a relief valve, to a reservoir (e.g., a pressure vessel). In embodiments, the reservoir maintains the pressure and temperature of the pressurized air until it is used by a jet ejector. In embodiments, the jet ejector is compromised of a series of nozzles that are distributed across the wing span that is in close proximity to the wing's leading edge. In embodiments, the series of nozzles release air in velocities that are higher than the free air stream velocity. In embodiments, the distribution of air velocities released over the top of the wing surface ensures that the air vectors are better distributed over the wing surface and minimize potential air turbulence issues. As a result of the distribution of air from the series of nozzles the lift, flight control, and stall are all better maintained.

FIG. 1 is an example environment in which systems and/or methods described herein may be implemented. As shown in FIG. 1, an aircraft wing area 100 is shown. In embodiments, aircraft wing area 100 is shown with schematic designs of each part of a system that can reutilize energy. While FIG. 1 shows each part in a particular location, the locations may be changed on aircraft wing area 100. FIG. 1 shows vortex rotor 101, transmission 102, drive shaft 103, stagnation compressor system 104, reservoir 105, and jet ejector 106.

In embodiments, vortex rotor 101 may be used to capture energy from a vortex of air that is created by a pressure differential (high pressure and low pressure) that is created above and below the end/tip portion of aircraft wing area 100. In embodiments, the pressure differential is known as the wing tip vortex which occurs when air travels from the high-pressure zone (e.g., below aircraft wing area 100) and the low-pressure zone (e.g., above aircraft wing area 100) in a rotational manner and is combined with a free stream that generates a circulation that is axled around the wing tip.

In embodiments, vortex rotor 101 is located at the wing tip area that is concentric with the axis of the vortex. In embodiments, the wing tip vortex and the vortex rotor are situated in a manner that is perpendicular to the wing span/parallel to the flow stream. In embodiments, this allows for the movement of the revolving air (of the vortex) to accelerate around the axis of the wing tip area portion causing vortex rotor 101 to gain kinetic energy.

In embodiments, the efficiency of vortex rotor 101 is inversely proportional to its produced parasitic drag footprint. In embodiments, vortex rotor 101 has minimal to no interaction with incoming airflow that is parallel to the axis of the vortex rotor 101. Instead, vortex rotor 101 only reacts with the circumferential airflow to facilitate a counter-reaction that in turn accelerates the rotor and is further discussed in FIG. 2.

Transmission 102 is also shown in FIG. 1. In embodiments, transmission 102 may be used as a second component in the first stage of the energy reutilization system. In embodiments, transmission 102 transfers any rotational energy generated by vortex rotor 101 to drive shaft 103 (via clutches, flywheels, hydraulic systems, etc., as further described in FIGS. 10-19. In embodiments, transmission 102 may physically transfer rotational motion from vortex rotor 101's shaft to the drive shaft 103. In addition, transmission 102 controls a value of rotational velocity and the corresponding torque that is transmitted to drive shaft 103. In embodiments, any energy input to vortex rotor 101 from the wing tip vortex is a variable value and is dependent on the magnitude of the wing tip air vortex, flight speed, and wind conditions (e.g., wind direction, wind speed, etc.).

In embodiments, transmission 102 is designed to exhibit a controlled output of torque to match the torque and speed requirements of the first component (i.e., reciprocating arms compressor which is used for compression) of the second system. In embodiments, transmission 102 is designed to exhibit a controlled output of torque to match the torque and speed requirements of the first component of the second system which includes reciprocating arms that are necessary for compression in the systems described herein.

In embodiments, drive shaft 103 is the third component in Stage 1 of the Wing Energy Reutilization System and extends across the span of the wing close in proximity to the wing's leading edge. In embodiments, drive shaft 103 has a number of stations across it that link with their corresponding compressor units. In embodiments, each station houses a set of three bevel gears. In embodiments, a driving gear is centered on the shaft and connects to one complementary driven bevel gear that attaches to the reciprocating compressor arms. Drive shaft 1010 which is described in FIGS. 10-19 is similar to drive shaft 103 and further describes the gears.

In embodiments, stagnation compressor system 104 is the first component of stage 2 of the energy reutilization system. In embodiments, stagnation compressor system 104 is a collection of individual units (which may be identical) that compress incoming air streams approaching a wing's leading edge (such as aircraft wing area 100's leading edge). In embodiments, each individual unit includes compressor teeth, compressor arms, and a pressure valve. In embodiments, each of the individual units (and their components) reduces the total volume of air and increases the air's static pressure during the compression cycle. In embodiments, these features of stagnation compressor system 104 are further described in FIGS. 10-19.

In embodiments, compressor teeth are protrusions from a front wing body with heads (that may be pointed in shape) that direct an incoming free air stream into two sub-streams on each side. In embodiments, the teeth also support compressor arms in compressing the approaching air stream. In embodiments, compressor arms are run by the drive shaft 103's bevel gears at a rotational speed that allows the compressor arms to travel at speeds greater than that of the incoming air stream.

In embodiments, reservoir 105 may be the second component of Stage 2 of the energy reutilization system and collects compressed air from all the individual compressor units through a piping network. In embodiments, reservoir 105 maintains, regulates, and delivers pressurized air to the jet ejectors (part of jet ejector 106) once activated. In embodiments, reservoir 105 is situated on the upper portion of a wing body that is in contact with the wing's upper panel. In embodiments, the location of reservoir 105 allows for benefiting from passing air above its surface and acts as a heat transfer mechanism to lower the temperature of the compressed air and allows for increasing the storage capacity of reservoir 105.

In embodiments, jet ejector 106 is the third and final component of Stage 2 of the energy reutilization system. In embodiments, jet ejector 106 is a distribution of nozzles on the upper front side of the wing over the compressor's sinusoidal leading edge. In embodiments, jet ejector 106 receives the pressurized air from reservoir 105 through pipe connections and releases the pressurized air at high velocities as the static pressure energy transforms into kinetic energy when passing through the nozzles. In embodiments, the nozzles release the air over the surface of the wing at local velocities higher than that of the existing passing air stream to create local zones of higher velocities and lower pressure transforming into an increased lift capacity of the wing.

Figure 2:
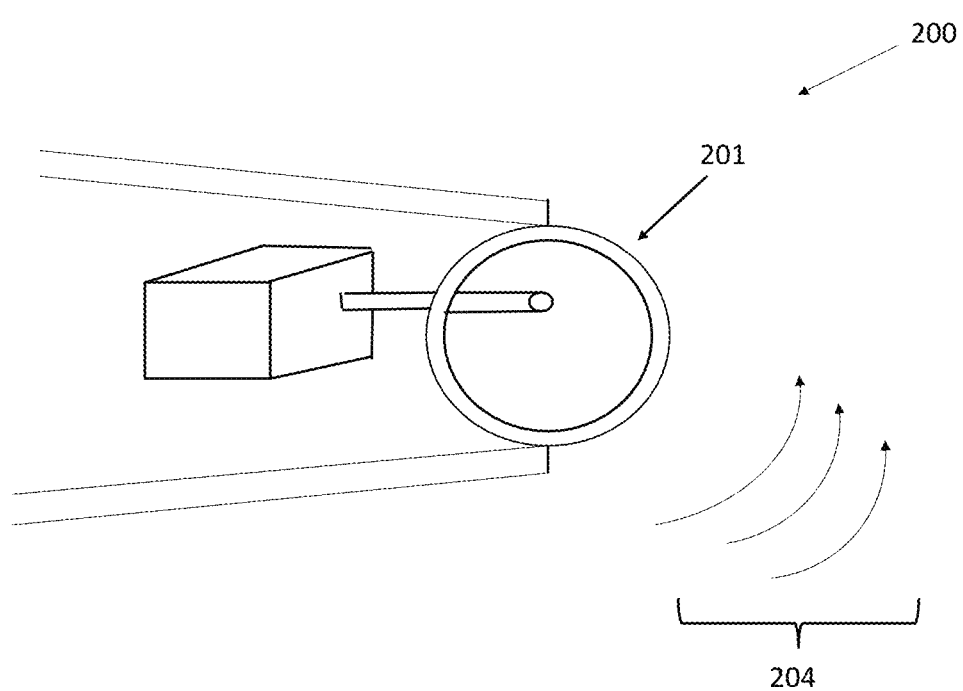
FIG. 2 is a diagram of an example vortex rotator.

FIG. 2 is an example vortex rotor 200. In embodiments, vortex rotor 200, (also known as a free-moving rotary wing tip) captures a portion of energy from the wing tip vortex and aids in weakening the vortex that resembles the source of pressure-induced drag. In embodiments, the efficiency of vortex rotor 200 is proportional to the value of vortex rotor 200's rotational momentum. Accordingly, the higher the angular velocity and torque of vortex rotor 200, the lower the wing tip vortex circulation and strength will be, and the higher the efficiency of the airplane will be.

Contrarily, vortex rotor 200's efficiency is inversely proportional to the value of the parasitic drag footprint it produces. In embodiments, the vortex rotor 200's design is optimized to capture energy from the wing tip vortex and not from the free airstream flow. Thus, while generating motion, vortex rotor 200 expresses negligible interaction with the airflow parallel to the axis of the wing tip vortex and instead solely reacts with the circumferential airflow to facilitate a counter-reaction that in turn accelerates the rotor.

In embodiments, vortex rotor 200 includes a distribution of streamlined straight blades that receive the circumferential airflow approaching from the wing's pressure side. In embodiments, as a counterreaction, the air, 204, moves and accelerates the rotor in its first 180° degrees of rotation starting from the bottom of the wing towards the top. In embodiments, the air then completes its other 180° degrees of rotation within the wing body to complete 360° of rotation.

In embodiments, to avoid the continuous stream of air getting within the wing from increasing the pressure inside, a relief valve is added in this section. In embodiments, rotor 201 of vortex rotor 200 is enclosed within the wing tip and has a controllable exposure area set to interface with the external flow. As the percentage of exposure changes, the energy-capturing potential of the rotor changes correspondingly as the interface surface area is a critical parameter that is controlled by the pilot.

Figure 3A:
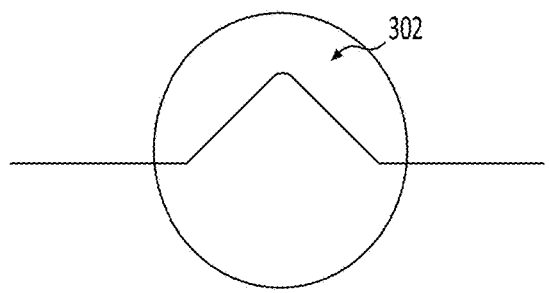
FIGS. 3A-3D are diagrams of example components of a stagnation compressor.
Figure 3B:
Figure 3C:
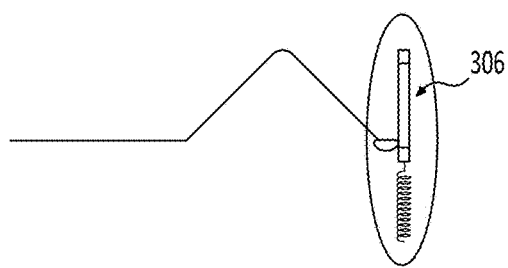
Figure 3D:
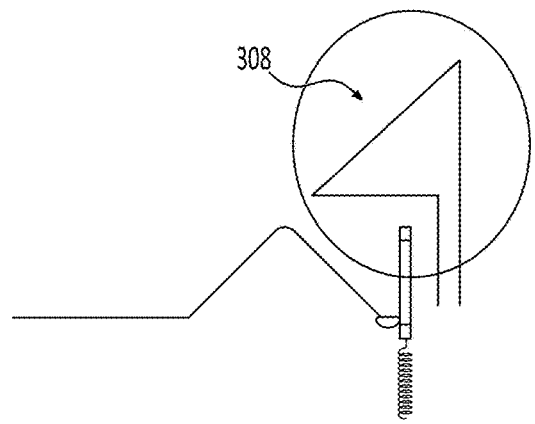

FIGS. 3A to 3D shows example components of a stagnation compressor. In FIG. 3A, compressor tooth 302 is shown. In FIG. 3B, pressure valve 304 is shown. In FIG. 3C, confining panel 306 is shown. In FIG. 3D, compressor arm 308 is shown. FIGS. 4A-4D shows an example compression process by a stagnation compressor that includes the teeth, valves, and panels described, such as stagnation compressor system 104 described in FIG. 1. Each of the components plays a role in the compression cycle and in unity they reduce the total volume of air and increase its static pressure. In embodiments, compressor teeth 302 are protrusions from the front wing body with pointed heads that direct the incoming free stream into two sub-streams on each side. The teeth also support the compressor arms (e.g., compressor arm 308) in compressing the air. Second, compressor arms 308 are run by gears (associated with a drive shaft such as drive shaft 103) at a rotational speed that allows compressor arm 308 to travel at speeds greater than the speed of the incoming stream of air.

In embodiments, by allowing compressor arm 308 to travel at speeds greater than that of the incoming air stream, there is a maintained efficiency that prevents drag and also prevents the formation of a pressure profile that is not in favor of the compressor. In embodiments, compressor arms 308 rotate towards the teeth (of corresponding profiles) from a starting position, as shown in FIG. 4A, until they make contact with the teeth tips in their first 45 degrees of rotation.

Figure 4A:
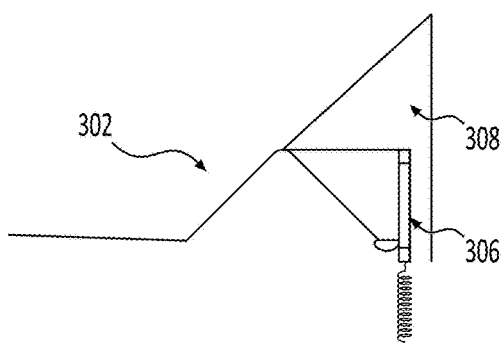
FIGS. 4A-4D are diagrams of an example compression process.
Figure 4B:
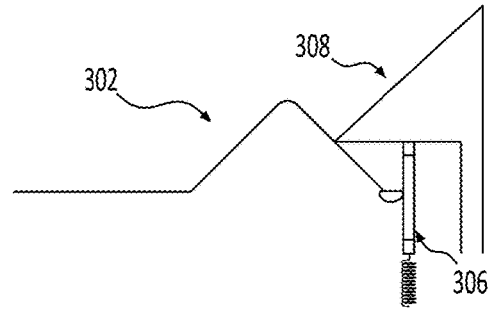
Figure 4C:
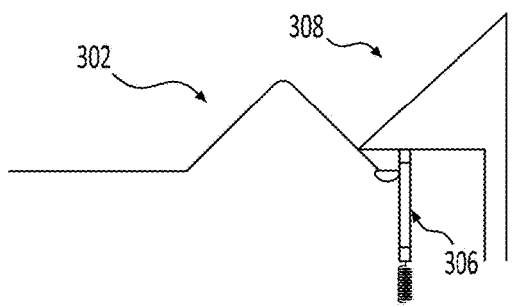
Figure 4D:
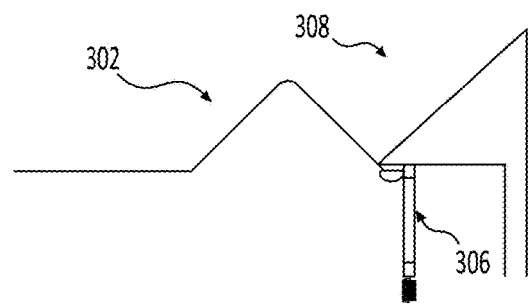

As shown in FIG. 4A, compressor arm 308 starts the compression cycle from its initial position at 0° degrees. Then, compressor arm 308 moves in touch with the compressor teeth 302 following its profile to complete its 90° degrees of rotation towards the pressure valve passing in the process through FIG. 4B and to FIG. 4D, finally finishing its rotation as shown in FIG. 4D. In embodiments, for FIGS. 4A-4D, once a total of 90 degrees is completed (based on the compression cycle), the remaining 270 degrees of rotation are for the compression arm to reposition itself back to the beginning of the compression cycle at 0° degrees position. In embodiments, compressor arm 308 rotates based on being attached to a gear that rotates based on another gear (such as a bevel gear) rotating with the drive shaft. In this portion of the revolution, a compression action takes place and the air volume decreases gradually. As shown in FIG. 4D to complete the (360° degrees) revolution, compressing arm 308 continues to rotate within a housing in the wing to allow for uninterrupted motion against the freestream.

Figure 5:
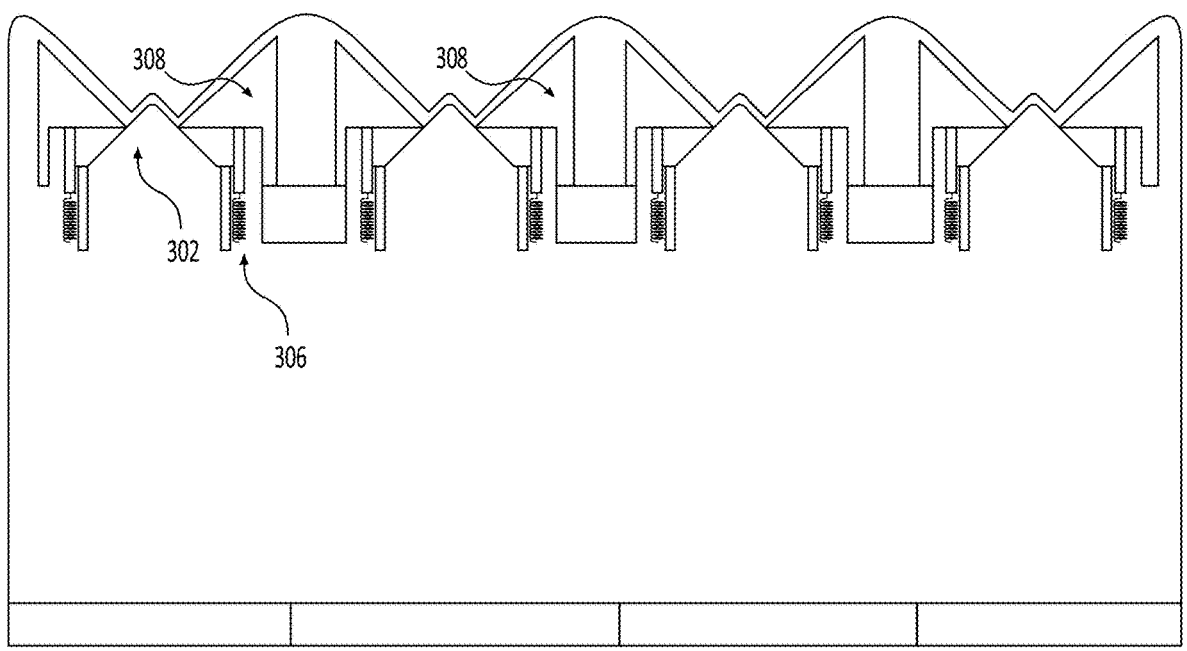
FIG. 5 is an example compressor arrangement.

FIG. 5 shows an example system including multiple teeth 302 and multiple compressor arms 308. In embodiments, as the volume decreases, and the temperature and pressure increase of air, a pressure valve (e.g., valve 304) confines the air until a set value of pressure is obtained which allows for the valve to open and allows the passage of air to a reservoir (e.g., reservoir 105). In embodiments, a confining panel (e.g., confining panel 306) acts as a shell that holds the air as it pressurizes and prevents leakage. In embodiments, the confining panel extends beyond a controlling pressure. Furthermore, an outer sinusoidal geometry faces the incoming freestream and aids in controlling stall as the tubercles interact with the air.

Figure 6:
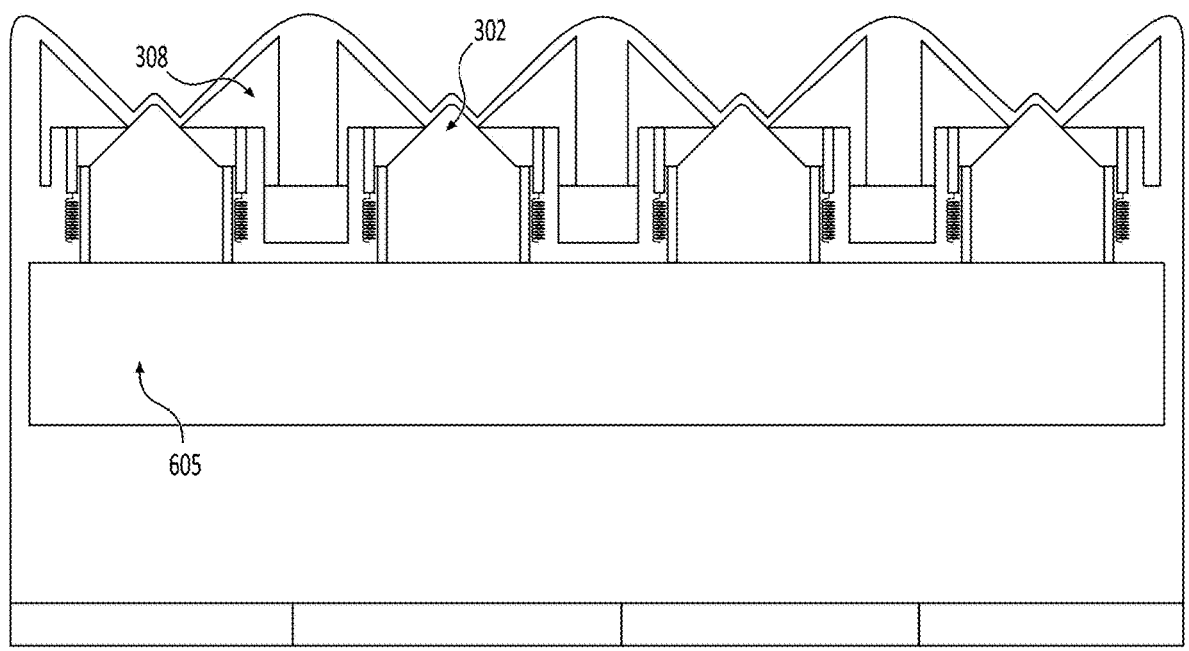
FIG. 6 is an example reservoir.

FIG. 6 shows an example system that includes reservoir 605, multiple teeth 302, and compressor arms 308. In embodiments, reservoir 605 is the second component of Stage 2 of the energy reutilization system and collects the compressed air from all the individual compressor units through a network of piping. In embodiments, reservoir 605 maintains, regulates, and delivers pressurized air to jet ejectors (once activated). In embodiments, reservoir 605 is located on the upper portion of the wing in contact with the upper panel. In embodiments, the forced convection heat transfer that takes place due to the passage of air over the upper surface of the air wing allows for reducing the temperature of the pressurized air and increasing the Reservoir's capacity.

Figure 7:
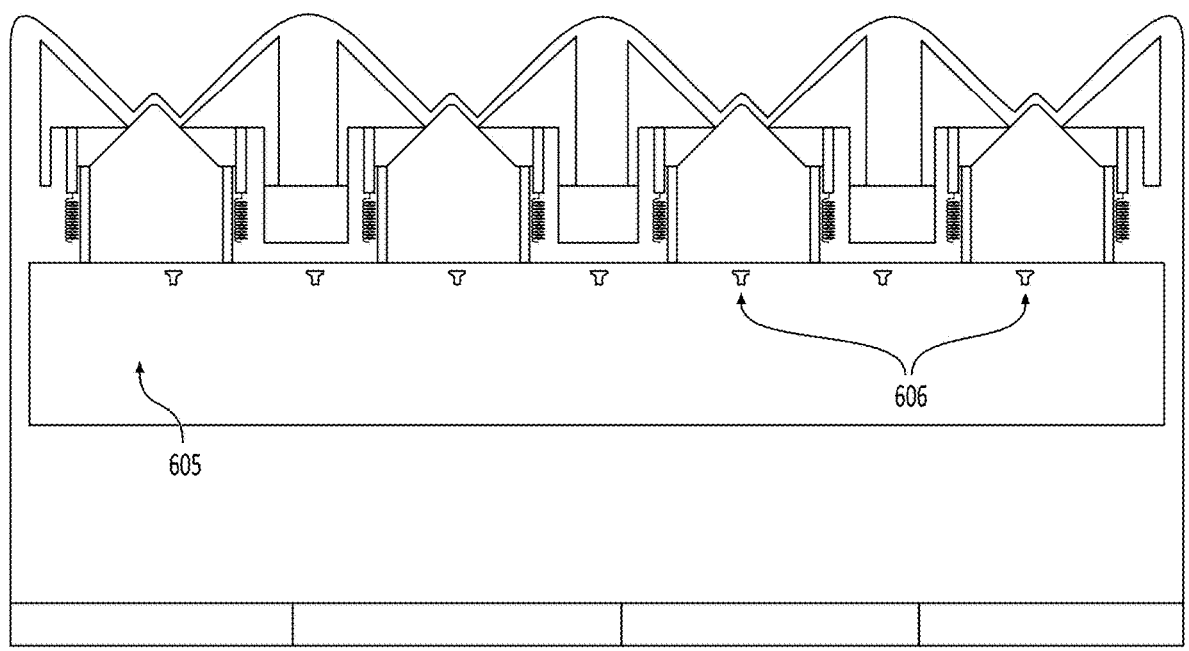
FIG. 7 is an example jet ejector.

In embodiments, jet ejectors 606 are the third and final component of Stage 2 of the energy reutilization system and are shown in FIG. 7. In embodiments, jet ejectors 606 may be similar to ejectors 106 (which may also be similar to nozzles 1020 described in other figures). In embodiments, jet ejectors 606 are a distribution of nozzles on the upper front side of the wing over the compressor's sinusoidal leading edge. In embodiments, jet ejectors 606 may receive pressurized air from a reservoir (e.g. reservoir 605) through pipe connections and releases it at high velocities. In embodiments, due to the release of the pressurized air at high velocities, the static pressure energy is transformed into kinetic energy when passing through jet ejectors 606. In embodiments, jet ejectors 606 release the air over the surface of the wing at local velocities higher than that of the existing passing air stream to create local zones of higher velocities and lower pressure.

Accordingly, the release of air over the surface of the wing at local velocities is higher than that of the existing passing air stream and results in an increase of the lift (and maintenance of the lift) of the airplane and maintain the lift for the duration of release. In addition, the increase in lift is independent of the angle of attack. Thus, the lift can be maintained in post-stall conditions aiding as a stall control mechanism. Furthermore, the lift can be enhanced when operating at low angles of attack when less lift is typically generated. In embodiments, jet ejectors 606 operate in integration with a compressor's sinusoidal leading edge to achieve an enhanced flow profile over the wing.

Accordingly, jet ejectors 606, are located on peaks of the sinusoid and disperse high-velocity jets on the zones trailing to the sinusoid peaks. leaving the air zones behind the sinusoid troughs to be accelerated and gain velocity by following the troughs profiles. In combination, the entire flow field over the upper surface of the wing is accelerated and enhanced homogeneously. In embodiments, the jet ejector nozzles manage the airflow field over an airplane wing as the individual nozzles are designed to be configured and directed while under operation to suit the flight conditions and result in the optimum flow field.

Figure 8:
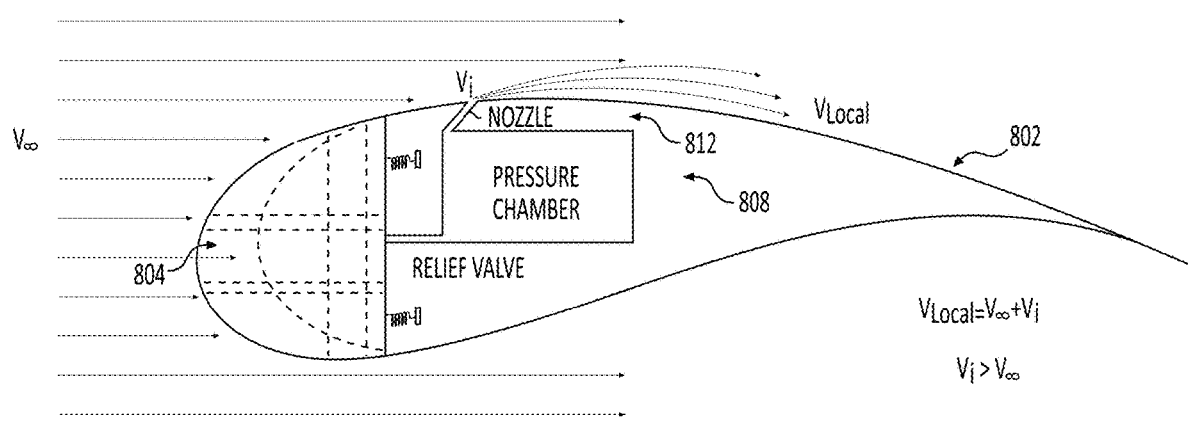
FIG. 8 is an example schematic diagram.

FIG. 8 shows a side schematic diagram of the energy reutilization system. FIG. 8 shows a side view of an example wing 802 and other components of an energy reutilization system similar to that shown in FIG. 1. FIG. 8 shows stagnation compressor 804 which includes multiple teeth (similar to teeth 302) and also compressing arms (similar to compressing arms 308). FIG. 8 also shows pressure chamber 808 which is similar to reservoir 605. FIG. 8 also shows nozzles 812 which are similar to jet ejectors 606. As shown in FIG. 8, air released from nozzles 812 are at velocity, $v_i$.

Accordingly, the combination of $v_i$ and $v_\infty$ (with $v_i$ being greater than $v_\infty$ where $v_\infty$ is the freestream velocity) results in $v_{local}$ which is at the top of the wing while $v_\infty$ is provided below the wing. Thus, the entire flow field over the upper surface of the wing is accelerated and enhanced homogeneously. In embodiments, the jet ejector nozzles manage the airflow field over an airplane wing as the individual nozzles are designed to be configured and directed while under operation to suit the flight conditions and result in the optimum flow field.

Figure 9:
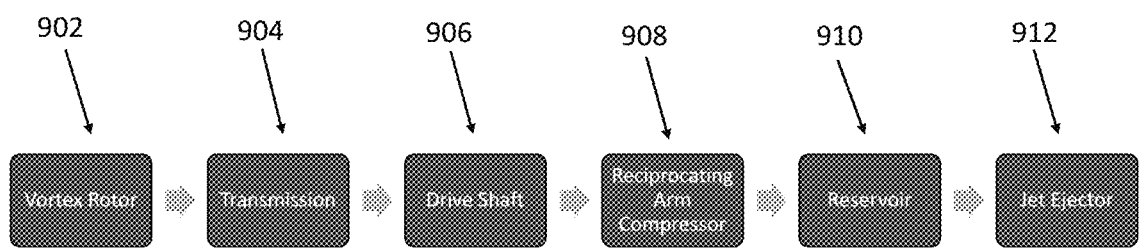
FIG. 9 is an example process diagram.

FIG. 9 shows a flow diagram of an example energy reutilization system. FIG. 9 shows vortex rotor 902, transmission 904, drive shaft 906, reciprocating arm compressor 908, reservoir 910, and jet ejector 912. In embodiments, these features are similar to those described in FIG. 10. In embodiments, FIG. 9 shows the process in which the energy reutilization system occurs with vortex rotor 902 taking incoming air from a side elevation of the wing, transmission 904 transfers energy from vortex rotor 902 for use in drive shaft 906. In embodiments, drive shaft 906 is then used by reciprocating arm compressors 908 to compressor air incoming at the front elevation of an aircraft wing. Then, the compressed air is distributed (via piping) to reservoir 910 in which the air is stored until it is released via jet ejector 912 across the top surface of an aircraft wing.

Figure 10:
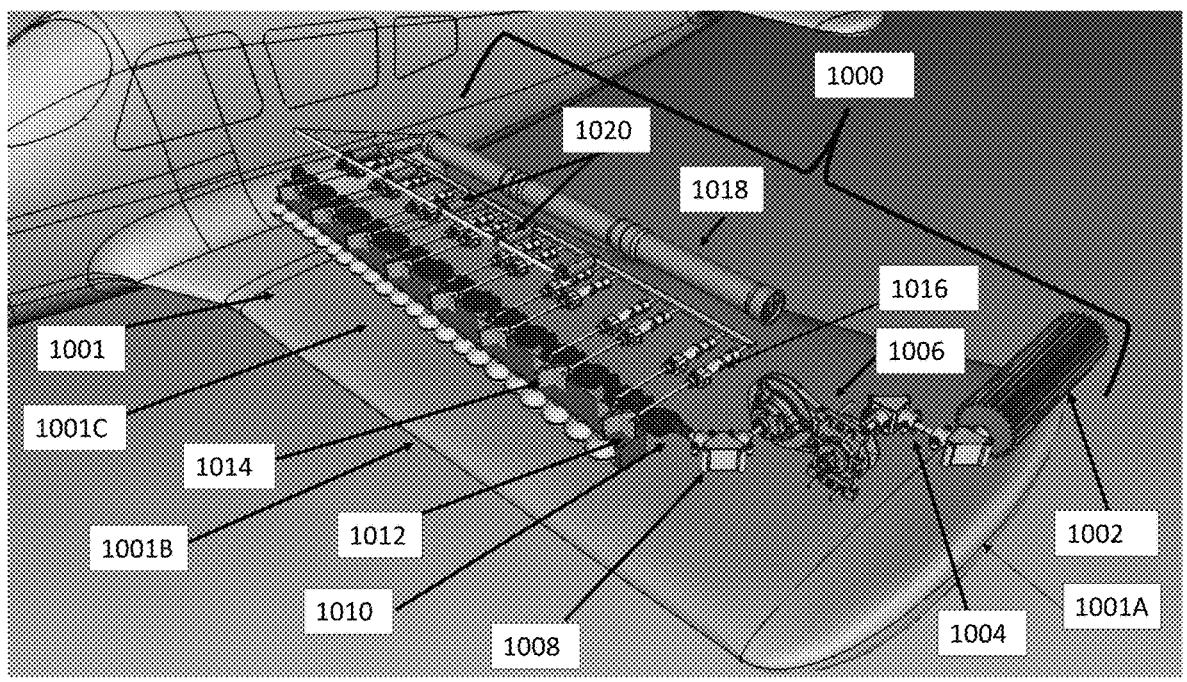
FIG. 10 is an example view of a wing energy reutilization system.

FIG. 10 is a diagram of an example wing energy reutilization system (system 1000). As shown in FIG. 10, system 1000 includes vertex rotor 1002, connector 1004, transmission 1006, connector 1008, drive shaft 1010, compressor arm 1012, teeth 1014, pressure valve 1016, reservoir 1018, and nozzles 1020. In addition, FIG. 10 also shows wing 1001. While system 1000 is shown in FIG. 10 on top of wing 1001 for the purposes of showing the structure of system 1000, system 1000 would be incorporated within the structure of wing 1001 which is part of an airplane (e.g., passenger jet, propeller airplane, etc.).

In embodiments, vortex rotor 1002 may be used to capture air energy from an air vortex that is created by a pressure differential (high pressure and low pressure) that is created above and below the end/tip portion of wing 1001A. In embodiments, the pressure differential is the cause of the wing tip vortex which occurs when air travels from a high-pressure zone (e.g., below aircraft wing area 1001) and a low-pressure zone (e.g., above aircraft wing area 1001) in a rotational manner and is combined with a free stream that generates air circulation that is axled around the wing tip.

In embodiments, vortex rotor 1002 is located at the wing tip area that is concentric with the axis of the wing tip vortex. In embodiments, this allows for the movement of the revolving air (of the vortex) to accelerate around the axis of the vortex rotor 1002 so that it can gain kinetic energy.

In embodiments, the efficiency of vortex rotor 1002 is inversely proportional to its produced parasitic drag footprint. In embodiments, vortex rotor 1002 has minimal to no interaction with airflow that is parallel to the axis of the wing tip. Instead, vortex rotor 1002 only reacts with the circumferential airflow to facilitate a counter-reaction that in turn accelerates the rotor as described in FIG. 2 (as vertex rotor 1002 is similar to vertex rotor 200).

In embodiments, vortex rotor 1002 is compromised of distribution of streamlined straight blades that receive the circumferential airflow approaching from the wing's high-pressure side and traveling to the wing's low-pressure side. In embodiments, as a counterreaction, air (in a similar fashion shown in FIG. 2) moves and accelerates the rotor in its first 180° degrees of rotation starting from the bottom of the wing towards the top. In embodiments, the air then completes its other 180° degrees of rotation within the wing body to complete one full rotation.

In embodiments, to avoid the continuous stream of air getting within the wing from increasing the pressure inside, a relief valve is added in this section to take the air outside of the wing body. In embodiments, vortex rotor 1002 is enclosed within the wing tip and has a controllable exposure area set to interface with the external flow. As the percentage of exposure changes, the energy-capturing potential of the rotor changes correspondingly as the interface surface area is a critical parameter that is controlled by the pilot.

In embodiments, transmission 1006 may be used as a second component in the first stage of the energy reutilization system. In embodiments, transmission 1006 transfers any rotational energy generated by vortex rotor 1002 (via connector 1004) to drive shaft 1010 (via connector 1008. In embodiments, transmission 1006 may physically transfer rotational motion from vortex rotor 1002's shaft to the drive shaft 1010. In addition, transmission 1006 controls a value of rotational velocity and the corresponding torque that is transmitted to drive shaft 1010. In embodiments, any energy input to vortex rotor 1002 from the wing tip vortex is a variable value and is dependent on the magnitude of the wing tip air vortex, flight speed, and wind conditions (e.g., wind direction, wind speed, etc.).

In embodiments, transmission 1006 is designed to exhibit a controlled output of torque to match the torque and speed requirements of the first component of the second system (i.e., compressor arm 1012). In embodiments, transmission 1006 is designed to exhibit a controlled output of torque to match the torque and speed requirements of the first component of the second system which is compressor arm 1012 (as described in additional figures) that are necessary for compression in the systems described herein.

In embodiments, drive shaft 1010 is the third component in Stage 1 of the Wing Energy Reutilization System and extends across the span of the wing close in proximity to the wing's leading edge. In embodiments, drive shaft 1010 has a number of stations across it that link with their corresponding compressor units. In embodiments, each station houses a set of bevel gears (bevel gears 1010A as described in additional figures). In embodiments, bevel gear 101A is centered on the shaft and connects to one other complementary gears 1010B that attaches the reciprocating compressor arms in each station.

In embodiments, the stagnation compressor is the first component of stage 2 of the energy reutilization system. In embodiments, the stagnation compressor is shown, compresses incoming air streams approaching a wing's leading edge (such as aircraft wing area 1001's leading edge, 1001B). In embodiments, each individual stagnation compressor is comprised of the compressing arm 1012 which works in conjunction with teeth 1014, pressure valve 1016, and confining panel (described in further figures). In embodiments, each stagnation compressor reduces the total volume of air and increases the air's static pressure during the compression cycle.

In embodiments, teeth 1014 are protrusions from a front wing body with heads (that may be pointed in shape) that direct an incoming free air stream into two sub-streams on each side. In embodiments, teeth 1014 also support compressor arms 1012 in compressing the incoming stream that is split by the teeth 1014 into two sub-streams that are then compressed by the compressor arms 1012 to finally pass through the pressure valve 1016. In embodiments, compressor arms 1012 are run by drive shaft 1010's bevel gears via gear 1010A at a rotational speed that allows the compressor arms 1012 to travel at speeds greater than that of the incoming air stream.

In embodiments, reservoir 1018 may be the second component of Stage 2 of the energy reutilization system and collects compressed air from all the pressure valves 1016 through a piping network (described in additional figures). In embodiments, reservoir 1018 maintains, regulates, and delivers pressurized air to ejectors 1020 once activated. In embodiments, reservoir 1018 may be situated on the upper portion of a wing area that is in contact with the upper panel.

In embodiments, nozzles 1020 are the third and final component of Stage 2 of the energy reutilization system. In embodiments, nozzles 1020 (which together may be similar to jet ejector 106 as described in FIG. 1) is a distribution of nozzles on the upper front side of wing 1001 over the compressor's sinusoidal leading edge. In embodiments, nozzles 1020 receives the pressurized air from reservoir 1018 through pipe connections (described in additional figures) and releases the pressurized air at high velocities as the static pressure energy transforms into kinetic energy when passing through the nozzles. In embodiments, the nozzles release the air over surface 1001C of wing 1001 at local velocities higher than that of the existing passing air stream to create local zones of higher velocities and lower pressure. Accordingly, the air released by the nozzles minimize turbulent air over the top surface of the wing as well as potential stall issues that can occur.

Figure 11:
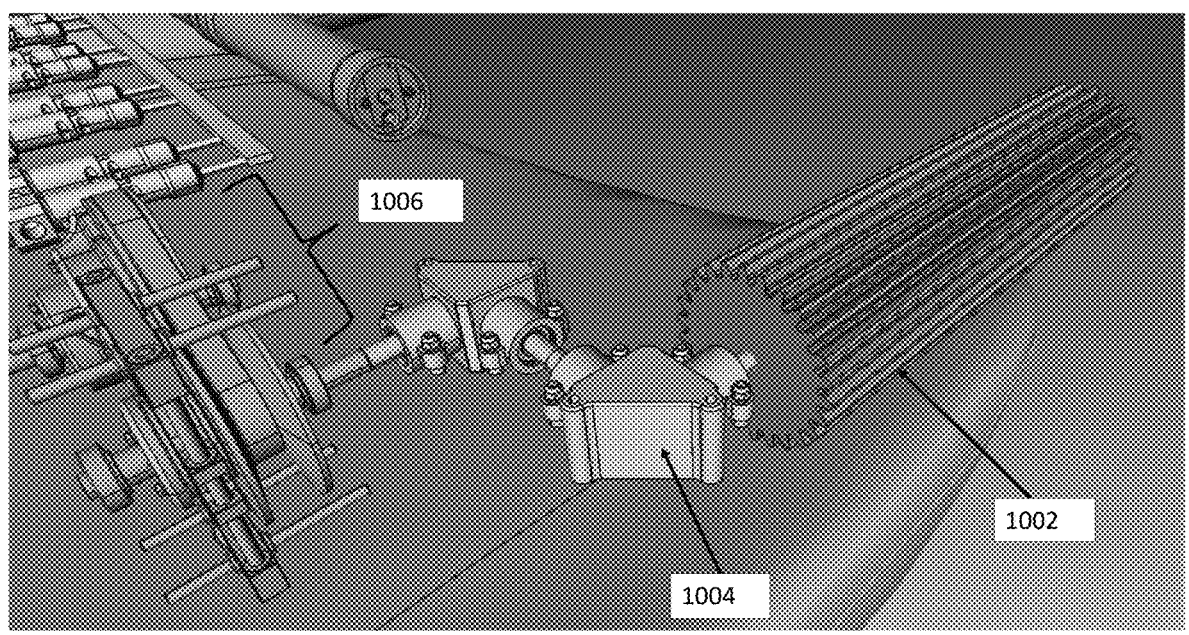
FIG. 11 is an example view of a wing energy reutilization system.

FIG. 11 describes a portion of system 1000. As shown in FIG. 11, vortex rotor 1002, connector 1004, and transmission 1006 are shown. In embodiments, as discussed in FIG. 1 and FIG. 10, vortex rotor 1002 rotates based on an air vortex created at wing area 1001A. In embodiments, as vortex rotor 1002 rotates, the rotational energy is transferred to transmission 1006 via connector 1004.

Figure 12:
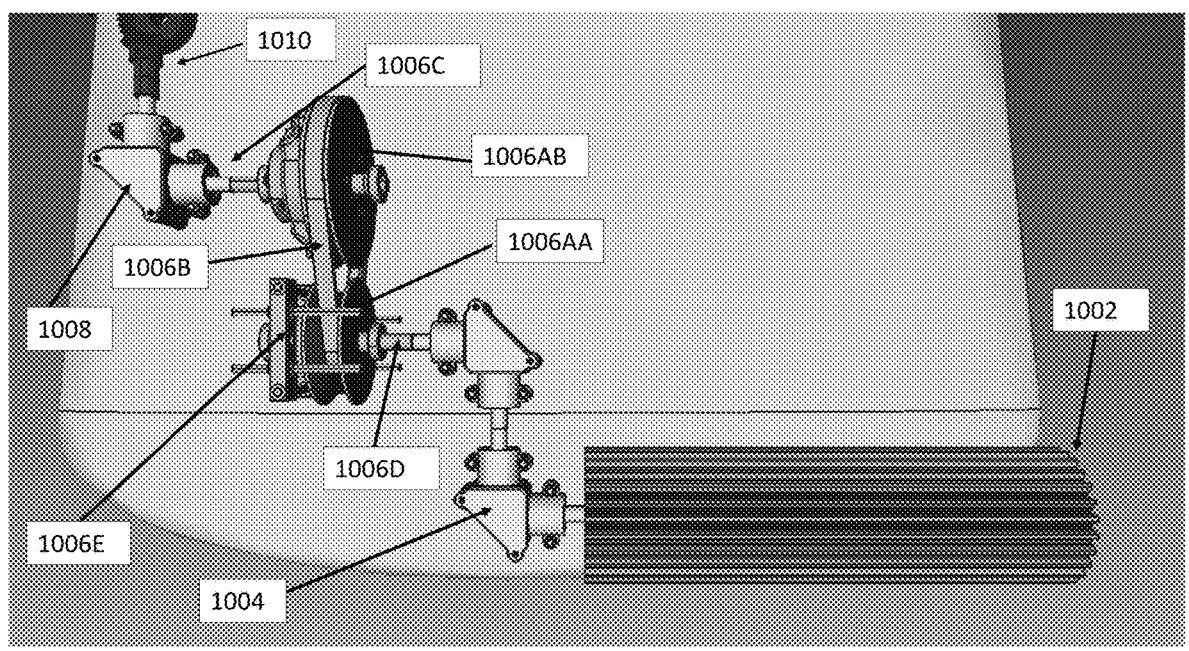
FIG. 12 is an example view of a wing energy reutilization system.

FIG. 12 further describes system 1000. As shown in FIG. 12, there is connector 1004 and transmission 1006 including primary shaft 1006D, primary regulating wheel 1006AA, secondary regulating wheel 1006AB, belt 1006B, and secondary shaft 1006C. In embodiments, transmission 1006 may be a hydraulic system.

In embodiments, primary shaft 1006D is a shaft that is parallel with a vortex rotor's shaft and passes through connector 1004 and primary regulating wheel 1006AA.

In embodiments, clutch 1006E is responsible for transmitting motion from a driving vortex rotor (e.g., vortex rotor 101) to the primary regulating wheel 1006AA. In embodiments, clutch 1006E may be controlled by electronic or pneumatic communications.

In embodiments, primary regulating wheel 1006AA and secondary regulating wheel 1006AB are two wheels that are separated in their axis of rotation and move dependently by belt 1006B that connects them. In embodiments, the first wheel is the main wheel mounted on the primary shaft 1006D and the second wheel is the secondary wheel connected to the secondary shaft 1006C. In embodiments, the two wheels may house belt 1006B in their central v-shaped cavities with widths that are adjusted hydraulically through the application or release of pressure. In embodiments, in an example that uses hydraulic pressure, a squeezing action pushes the belt further radially from the center of one wheel and pulls it towards the center of the other. In embodiments, when belt 1006B is pressed by the hydraulic pressure on one wheel, its radius of rotation increases, and with it its angular speed reduces pursuing greater torque.

Additionally, belt 1006B can move towards the center of the secondary regulating wheel 1006AB, reducing its radius of rotation and increasing its angular speed in the sacrifice of torque for speed. Accordingly, this mechanism allows for having an input value of torque/speed at the primary shaft that can be manipulated to the secondary shaft 1006C to match any desired torque/speed output value.

In embodiments, hydraulic system is responsible for exerting controlled pressure on both depth-regulating wheels in order to achieve the wheel widths necessary for making the belt rotate at a particular radius on each wheel and transmit the intended value of torque and speed. In embodiments, belt 1006B is comprised of a series of metal plates that are connected in series to form a belt that has both the flexibility and rigidity needed for transferring the torque between the primary shaft 1006D and secondary shaft 1006C. In embodiments, the secondary shaft 1006C is a shaft held by bearings and is parallel to the primary shaft. In embodiments, the secondary shaft 1006C carries motion from the secondary width regulating wheel 1006AB to connector 1008. In embodiments, connector 1008 is connected to drive shaft 1010, and connector 1008 which transfers torque to drive shaft 1010.

Figure 13:
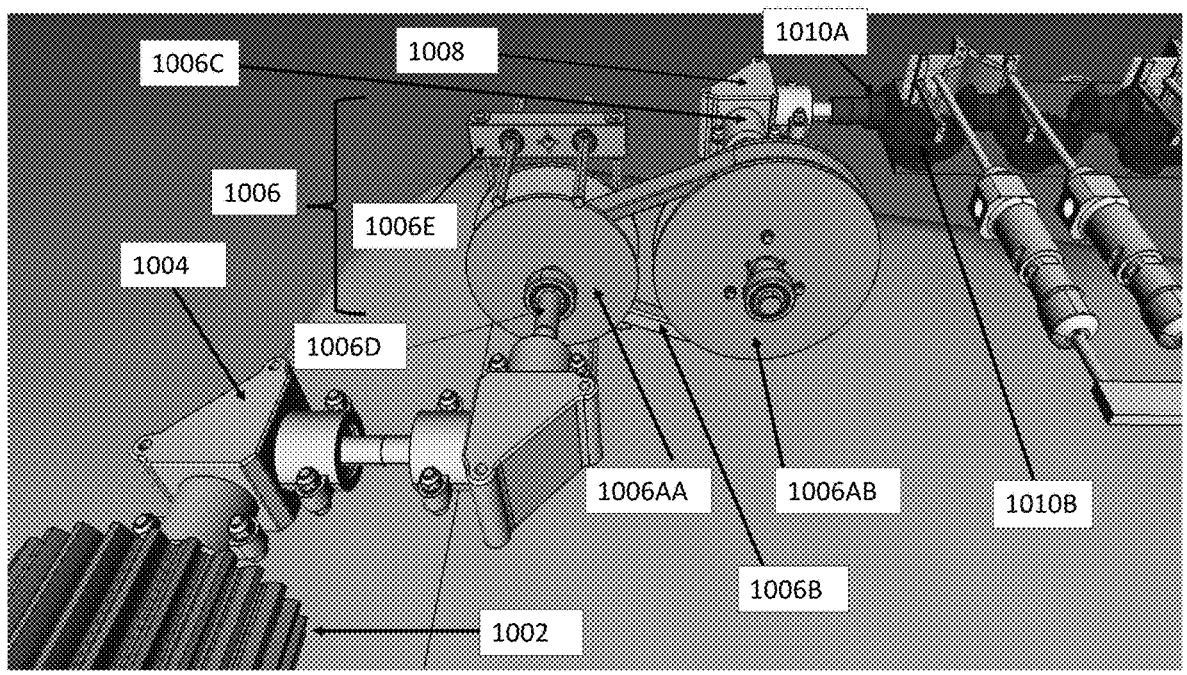
FIG. 13 is an example view of a wing energy reutilization system.

FIG. 13 is a diagram of a portion of an example system 1000. In embodiments, FIG. 13 shows the features described in FIG. 12 from a different perspective view.

Figure 14:
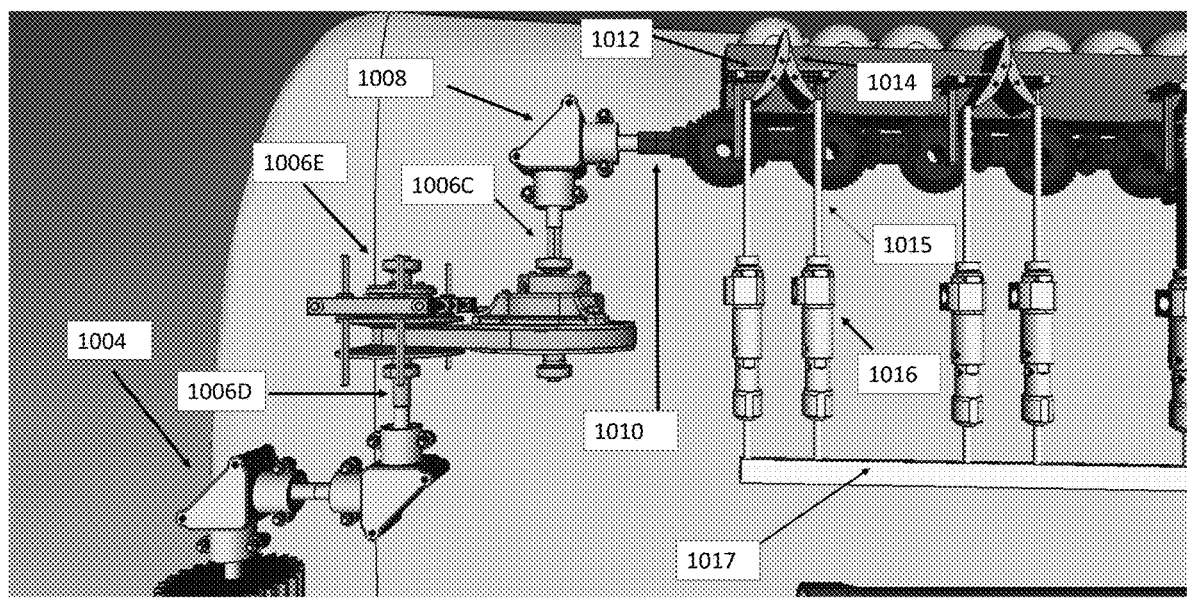
FIG. 14 is an example view of a wing energy reutilization system.

FIG. 14 is a diagram of a portion of an example system 1000. As shown, FIG. 14 describes features shown in FIGS. 12 and 13 as well as teeth 1014, compressing arms 1012, pipe 1015, pressure valve 1016, and piping section 1017.

As shown in FIG. 14, bevel gears 1010A transfer the torque from vortex rotor 1002 via connector 1004 and connector 1008 to drive shaft 1010.

In embodiments, drive shaft 1010 is the third component in Stage 1 of the Wing Energy Reutilization System and extends across the span of the wing close in proximity to the wing's leading edge. In embodiments, drive shaft 1010 has a number of stations across it that link with their corresponding compressor units. In embodiments, each station houses a set of bevel gears (bevel gears 1010A and as described in additional figures). In embodiments, a driving gear (gear 1010B as described in additional figures) is centered on the shaft and connects to one of the other complementary gears 1010B that attach reciprocating compressor arms 1012.

In embodiments, the stagnation compressor is the first component of stage 2 of the energy reutilization system. In embodiments, stagnation compressor are shown and receive incoming air streams approaching a wing's leading edge (such as aircraft wing area 1001's leading edge, 1001B). In embodiments, each pressure valve 1016 permits air to pass through when the pressure is above a particular threshold level.

In embodiments, teeth 1014 are protrusions from a front wing body with heads (that may be pointed in shape) that direct an incoming free air stream into two sub-streams on each side. In embodiments, teeth 1014 also support compressor arms 1012 in compressing the free air stream that passes through piping sections 1015. Furthermore, compressor arms are run by the drive shaft 1010's bevel gears via gear 1010A at a rotational speed that allows the compressor arms 1012 to travel at speeds greater than that of the incoming air stream.

Figure 15:
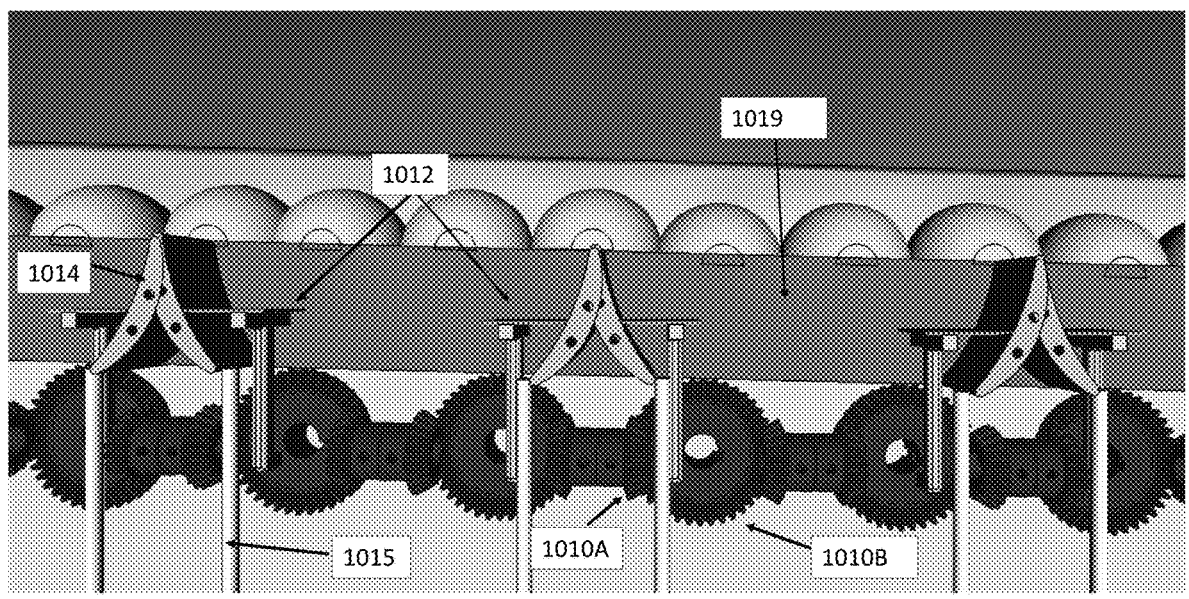
FIG. 15 is an example view of a wing energy reutilization system.

FIG. 15 is a diagram of an example portion of system 1000. FIG. 15 further shows compressor arms 1012, teeth 1014, and piping sections 1015. FIG. 15 also shows bevel gears 1010A and gears 1010B. In embodiments, as air passes between compressor confining panels 1019 and teeth 1014, the air then enters piping sections 1015. Based on the movement of bevel gears 1010A, gears 1010B rotate. In embodiments, the rotation of gears 1010B results in the movement of compressing arms 1012 in a rotation manner that causes the air to be pushed into entering piping section 1015 for compression in each pressure valve 1016 so that pressure above a particular threshold pressure level is reached for the air once it reaches a pressure valve. Also, FIG. 15 includes confining panel 1019. While not shown, another confining panel 1019 would be placed above teeth 1014 and compressing arms 1012 so as to ensure that incoming wind passes via teeth 104 into piping sections 1015

Figure 16:
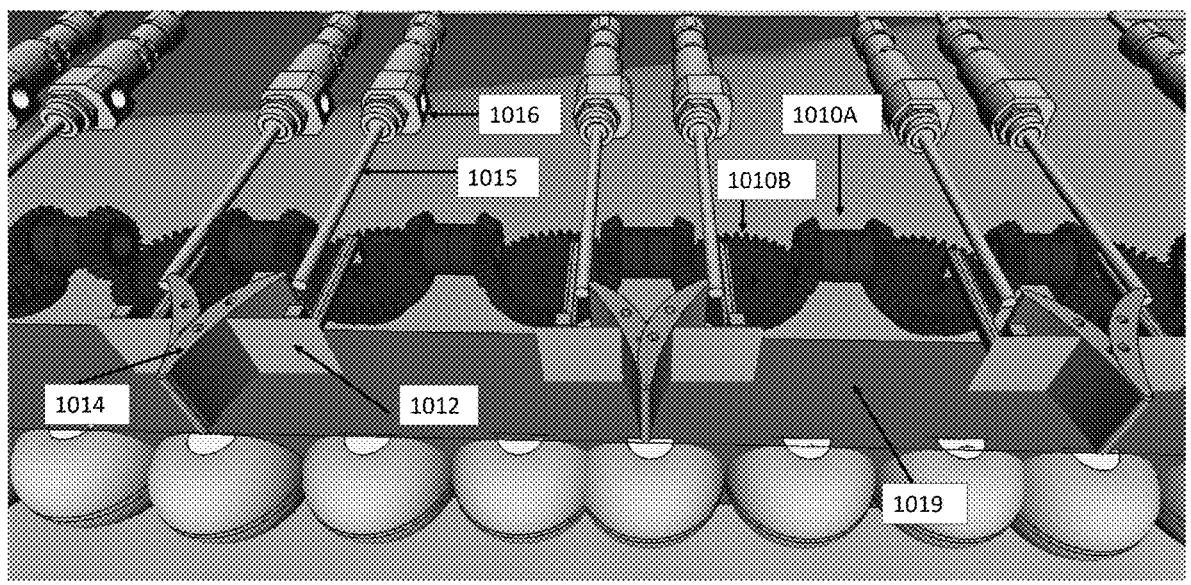
FIG. 16 is an example view of a wing energy reutilization system.
Figure 17:
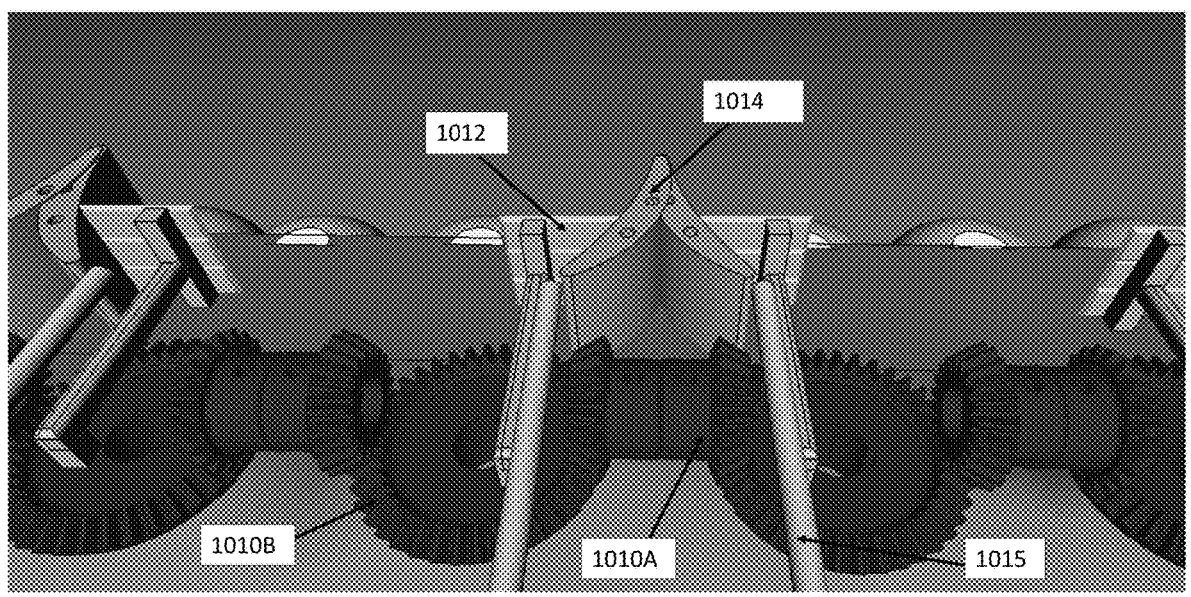
FIG. 17 is an example view of a wing energy reutilization system.

FIG. 16 is a diagram of an example portion of system 1000. FIG. 16 shows the features described in FIG. 15 from a different perspective view, such as viewing system 1000 from leading edge 1001B of wing 1001. FIG. 17 is a diagram of an example portion of system 1000. FIG. 17 shows the features described in FIG. 15 from another perspective view.

Figure 18:
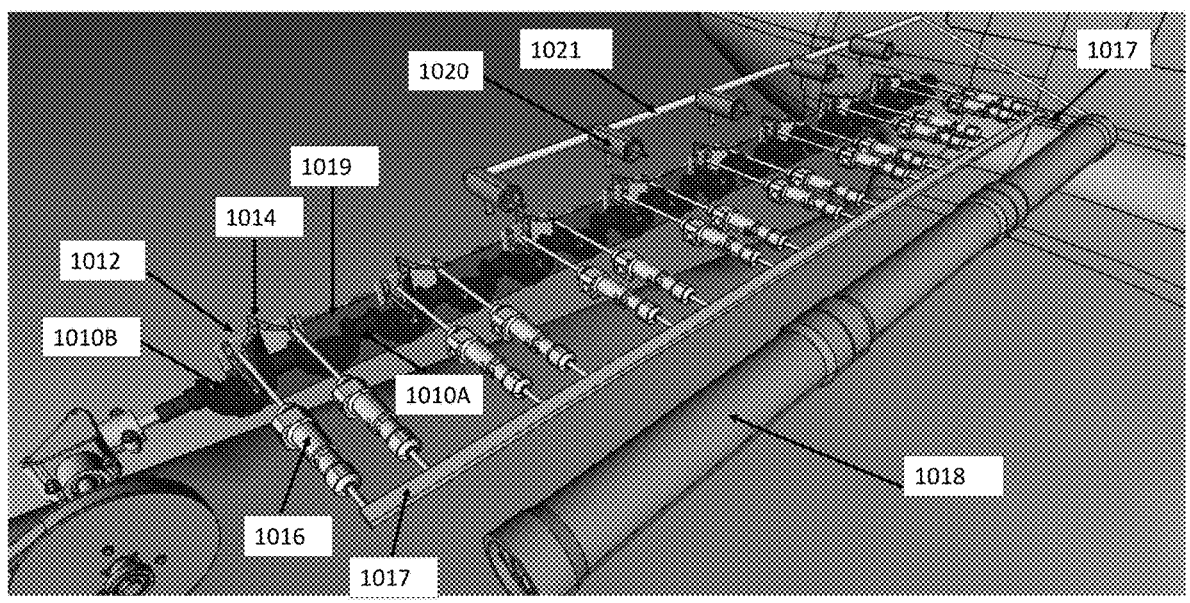
FIG. 18 is an example view of a wing energy reutilization system.

FIG. 18 is a diagram of an example portion of system 1000. As shown in FIG. 18, piping section 1017 obtains the compressed air from pressure valve 1016 (based on the processes and systems described in other figures). In embodiments, the compressed air from piping section 1017 is sent to reservoir 1018. In embodiments, reservoir 1018 is then distributed, via piping section 1021 to jet ejector 1020.

In embodiments, reservoir 1018 maintains, regulates, and delivers pressurized air to the jet ejectors once activated. In embodiments, reservoir 1018 may be situated on the upper portion of a wing area (but within the wing body) that is in contact with the upper surface of the wing.

In embodiments, jet ejector 1020 is a distribution of nozzles on the upper front side of the wing over the wing's front sinusoidal leading edge. In embodiments, jet ejector 1020 receives the pressurized air from reservoir 1018 through pipe connections and releases the pressurized air at high velocities as the static pressure energy transforms into kinetic energy when passing through the nozzles. In embodiments, the nozzles release the air over the surface of the wing at local velocities higher than that of the existing passing air stream to create local zones of higher velocities and lower pressure.

Accordingly, nozzles 1020 are located on peaks of the sinusoid disperse high-velocity jets on the zones trailing to the sinusoid peaks. leaving the air zones behind the sinusoid troughs to be accelerated and gain velocity by following the troughs profiles. In combination, the entire flow field over the upper surface of the wing is accelerated and enhanced homogeneously. In embodiments, the jet ejector nozzles manage the airflow field over an airplane wing as the individual nozzles are designed to be configured and directed while under operation to suit the flight conditions and result in the optimum flow field.

In embodiments, air released from jet ejector 1020 is at velocity, $v_i$. Accordingly, the combination of $v_i$ and $v_\infty$ (with $v_i$ being greater than $v_\infty$) results in $v_{local}$ which is at the top of the wing while $v_\infty$ is provided below the wing. Thus, the entire flow field over the upper surface of the wing is accelerated and enhanced homogeneously. In embodiments, these jet ejector nozzles (jet ejector 1020) manage the airflow field over an airplane wing as the individual nozzles are designed to be configured and directed while under operation to suit the flight conditions and result in the optimum flow field. Accordingly, the optimum flow field minimizes turbulent air over the top surface of the wing as well as stall issues that can occur.

Figure 19:
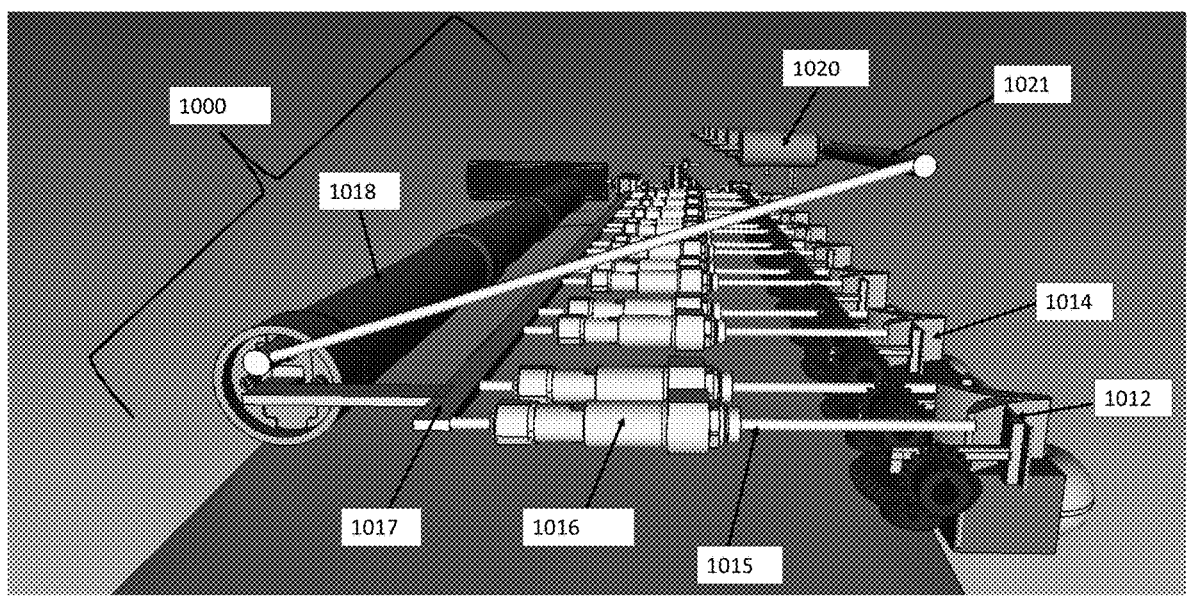
FIG. 19 is an example view of a wing energy reutilization system.

FIG. 19 shows a diagram of an example system 1000. FIG. 19 shows a side perspective view of system 1000 with features described and shown in FIG. 20.

Figure 20:
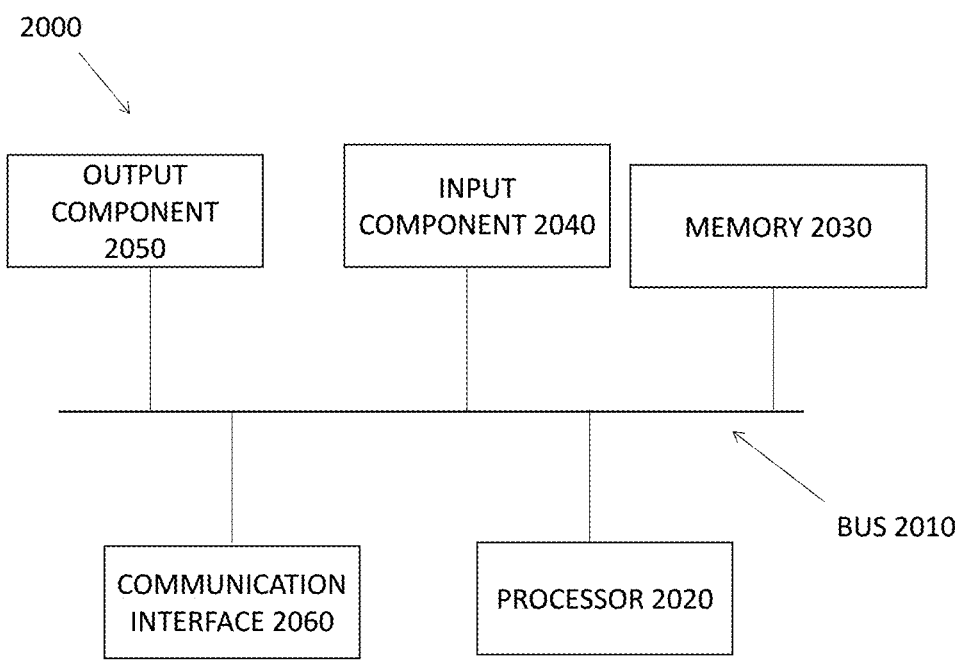
FIG. 20 is an example computing device.

FIG. 20 is a diagram of example components of a device 2000. Device 2000 may correspond to a portion of system 1000. In embodiments, any portion, or all, of system 1000 may include one or more devices 2000 and/or one or more components of device 2000.

As shown in FIG. 20, device 2000 may include a bus 2010, a processor 2020, a memory 2030, an input component 2040, an output component 2050, and a communications interface 2060. In other implementations, device 2000 may contain fewer components, additional components, different components, or differently arranged components than depicted in FIG. 20. Additionally, or alternatively, one or more components of device 2000 may perform one or more tasks described as being performed by one or more other components of device 2000.

Bus 2010 may include a path that permits communications among the components of device 2000. Processor 2020 may include one or more processors, microprocessors, or processing logic (e.g., a field programmable gate array (FPGA) or an application-specific integrated circuit (ASIC)) that interprets and executes instructions. Memory 2030 may include any type of dynamic storage device that stores information and instructions, for execution by processor 2020, and/or any type of non-volatile storage device that stores information for use by processor 2020. Input component 2040 may include a mechanism that permits a user to input information to device 2000, such as a keyboard, a keypad, a button, a switch, a voice command, etc. Output component 2050 may include a mechanism that outputs information to the user, such as a display, a speaker, one or more light-emitting diodes (LEDs), etc.

Communications interface 2060 may include any transceiver-like mechanism that enables device 2000 to communicate with other devices and/or systems. For example, communications interface 2060 may include an Ethernet interface, an optical interface, a coaxial interface, a wireless interface, or the like. In another implementation, communications interface 2060 may include, for example, a transmitter that may convert baseband signals from processor 2020 to radio frequency (RF) signals and/or a receiver that may convert RF signals to baseband signals. Alternatively, communications interface 2060 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 2060 may connect to an antenna assembly (not shown in FIG. 20) for transmission and/or reception of the RF signals. The antenna assembly may include one or more antennas to transmit and/or receive RF signals over the air. The antenna assembly may, for example, receive RF signals from communications interface 2060 and transmit the RF signals over the air, and receive RF signals over the air and provide the RF signals to communications interface 2060. In one implementation, for example, communications interface 1060 may communicate with a network, such as a satellite system, wireless system, etc. Thus, for example, a part of system 1000 may include a device 2000 with a communication interface 2060 that can communicate with a satellite system, a wireless system, or another type of system that is located on an airplane or on the ground.

As will be described in detail below, device 2000 may perform certain operations. Device 1000 may perform these operations in response to processor 2020 executing software instructions (e.g., computer program(s)) contained in a computer-readable medium, such as memory 2030, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 2030 from another computer-readable medium or from another device. The software instructions contained in memory 2030 may cause processor 2020 to perform the processes described herein. Alternatively, hardwired circuitry may be used in place of or in combination with software instructions to implement processes described herein. Thus, implementations described herein are not limited to any specific combination of hardware circuitry and software.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it is understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing and/or electronic networking environment and may require one or more computing devices, as described in FIG. 20, to complete such actions.

In the preceding specification, the use of the term "energy" includes any form of energy associated with air wind that occurs when an airplane is flying. In embodiments, energy may be associated with wind pressure, wind velocity, wind temperature, wind direction, wind vortex, and/or any other wind feature.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by an energy reutilization system, wind, wherein the wind passes through a vortex rotor, which is part of the energy reutilization system, located at an edge of the wing that is furthest away from a body of an airplane, and wherein the vortex rotor is perpendicular to the wing span;
   rotating, by the energy reutilization system, the vortex rotor based on the received wind, wherein the rotation of the vortex rotor generates work;
   transferring, by the energy reutilization system, the generated work from the vortex rotor to a drive shaft, wherein the drive shaft is part of the energy reutilization system;
   rotating, by the energy reutilization system, the drive shaft;
   rotating, by the energy reutilization system, a first bevel gear, and a second bevel gear, wherein the first bevel gear and the second bevel gear are connected to the drive shaft;
   receiving, by the energy reutilization system, additional wind wherein the additional wind passes across a front portion of the wing;
   compressing, by the energy reutilization system, the additional wind; wherein the compression of the additional wind is done by a tooth and a compressing arm that are both part of the energy reutilization system;
   sending, by the energy reutilization system, the additional wind through a pressure valve; and
   sending by the energy reutilization system, the additional wind from the pressure valve to a reservoir, wherein the reservoir is part of the energy reutilization system.

2. The method of claim 1, further comprising:
   sending, by the energy reutilization system, the additional wind to a nozzle,
   wherein the nozzle is connected to the reservoir via a piping system;
   pushing, by the energy reutilization system, the additional wind out of the nozzle,
   wherein the additional wind pushed out of the nozzle is used as an air flow field over the wing.

* * * * *